(12) United States Patent
Klein et al.

(10) Patent No.: US 6,220,059 B1
(45) Date of Patent: Apr. 24, 2001

(54) METHOD OF COATING A UV-FIBER WITH BLOCKING LAYERS AND CHARGING THE FIBER WITH HYDROGEN OR DEUTERIUM

(75) Inventors: Karl-Friedrich Klein, Friedberg; Georg Hillrichs, Friedland; Ulrich Grzesik, Freigericht, all of (DE); Shigeru Yamagata, Koriyama (JP)

(73) Assignees: Heraeus Quarzglas GmbH, Hanua (DE); Shin Etsu Quartz Products Co., Ltd., Tokyo (JP)

( * ) Notice: Subject to any disclaimer, the term of this patent is extended or adjusted under 35 U.S.C. 154(b) by 0 days.

(21) Appl. No.: 08/772,659

(22) Filed: Dec. 23, 1996

(30) Foreign Application Priority Data

Dec. 21, 1995 (DE) .................................. 195 47 904
May 23, 1996 (JP) .................................... 8-128625

(51) Int. Cl.[7] ................................................ C03B 37/027
(52) U.S. Cl. ................................. 65/394; 65/424; 65/430
(58) Field of Search .............................. 65/394, 424, 423, 65/430, 392

(56) References Cited

U.S. PATENT DOCUMENTS

| 4,946,248 | 8/1990 | Grzesik ........................ 350/96.21 |
| 5,062,687 | * 11/1991 | Sapsford . |
| 5,478,371 | * 12/1995 | Lemaire ............................ 65/424 |
| 5,597,622 | 1/1997 | Zöller ............................. 427/563 |

FOREIGN PATENT DOCUMENTS

| 4034059 | 12/1990 | (DE) . |
| 136 708 | * 4/1985 | (EP) ............................... 65/424 |
| 0401845 | 12/1990 | (EP) . |
| 483477 | 8/1991 | (EP) . |

OTHER PUBLICATIONS

Abstract for JP 54–121007 01–1984.
Abstract for JP 60–056457, 03–1994.

* cited by examiner

Primary Examiner—John Hoffmann
(74) Attorney, Agent, or Firm—Andrew L. Tiajoloff

(57) ABSTRACT

A method of producing an optical component for the transmission of UV light is provided. An optical fiber is prepared from synthetic quartz glass or from doped synthetic quartz glass with a transmission region for the transmission of UV light, and the transmission region is charged with hydrogen and/or with deuterium. The charging includes coating the fiber with a blocking layer inhibiting hydrogen diffusion, and charging the fiber in an atmosphere containing hydrogen and/or deuterium. This atmosphere is under a pressure in the range from 0.1 MPa to 200 MPa and at a temperature between 100° C. and 800° C. so as to produce a concentration of said hydrogen and/or deuterium of at least $5 \times 10^{19}$ molecules/cm$^3$ in the transmission region. The coating and charging steps may be performed repeatedly, and the blocking layer is built up to comprise a plurality of thinner layers including a top layer, after application of which charging is discontinued.

2 Claims, 4 Drawing Sheets

METHOD OF COATING A UV-FIBER WITH BLOCKING LAYERS AND CHARGING THE FIBER WITH HYDROGEN OR DEUTERIUM

BACKGROUND OF THE INVENTION

The invention relates to an optical component for the transmission of high-energy ultraviolet radiation, which has a transmission region of synthetically manufactured quartz glass, in which hydrogen and/or deuterium is contained in a concentration of at least $5 \times 10^{19}$ molecules per cubic centimeter, and which is encased at least partially in a first blocking layer imperious to hydrogen or one which impedes the diffusion of hydrogen.

Such a component is disclosed in DE-C 1 40 34 059. The optical component described therein is in the form of a fiber with a core of synthetic quartz glass and a jacket enveloping the core which has a lower index of refraction than the core. The core glass of the generic component is charged with hydrogen in a concentration of at least $1 \times 10^{19}$ molecules per $cm^3$ and has a hydroxyl ion concentration of 600 ppm. To prevent hydrogen loss by diffusion the fiber is encased in a diffusion blocking layer of graphite with a thickness of 0.2 $\mu m$. A tight graphite coating can effectively prevent hydrogen loss, so that the mechanical and optical properties of the fiber remain preserved over a long period of time; the application of such a coating is, however, relatively expensive.

SUMMARY OF THE INVENTION

The present invention, therefore, is addressed to the problem of producing a component for the transmission of high-energy UV light in which the mechanical and optical properties remain preserved over a long period of time in practical use, and which at the same time will be easy to manufacture at low cost.

The invention furthermore relates to a method of producing an optical component for the transmission of high-energy UV light by preparing an optical fiber of synthetic quartz glass or of doped synthetic quartz glass, which is provided with a transmission region for the transmission of high-energy UV light, and charging the transmission region with hydrogen and/or with deuterium.

Such a method is disclosed in JP A 6-56457. In the method described therein, an optical fiber is treated in an atmosphere containing hydrogen at a temperature ranging between 1000° C. and 2000° C. It has been found, however, that with this method high hydrogen or deuterium concentrations of at least $5 \times 10^{19}$ molecules/$cm^3$ cannot be reached.

The invention is thus addressed to the problem of devising a method by which high hydrogen or deuterium concentrations can be achieved in the transmission region of the optical component.

The invention furthermore relates to a special manner of using an optical component for the transmission of high-energy UV light, wherein the component has a transmission region of synthetically made quartz glass in which hydrogen and/or deuterium are contained in a concentration of at least $5 \times 10^{19}$ molecules/$cm^3$.

It is known, from European patent application EP-Al 0 401 845 to use optical components, such as lenses, prisms, filters or windows for the transmission of high-energy ultraviolet radiation in the wavelength range below 360 nm. The optical components proposed for the purpose consist of high-purity, synthetic quartz glass with a hydrogen concentration in the range from $1 \times 10^{16}$ molecules/$cm^3$ to $1 \times 10^{20}$ molecules/$cm^3$.

The optical power and energy densities that can be transmitted by means of optical components are limited by material-specific destruction thresholds above which the optical properties of the transmission media are changed irreversibly. It has been found that hydrogen is able to prevent or heal such radiation damage in quartz glass. The energy densities of the UV light transmitted according to EP-Al 0 401 845 are, for example, around 0.1 J/$cm^2$ per pulse (in the case of radiation of a wavelength of 193 nm) or about 0.4 J/$cm^2$ per pulse (in the case of radiation of a wavelength of 248 nm). The quartz glass was found to have maximum stability under radiation at a hydrogen charge of approximately $1 \times 10^{18}$ to $1 \times 10^{19}$ molecules/$cm^3$, depending on the wavelength of the radiation. At higher hydrogen concentrations the stability under radiation was observed to be poorer.

The present invention is therefore also addressed to the problem of devising a method of application optimized for the transmission of high-energy UV light.

With regard to the optical component, the problem described above is solved by the invention by the fact that the blocking layer consists of quartz glass.

A blocking layer of quartz glass is especially easy to produce and is optically transparent throughout the UV wavelength range down to wavelengths of approximately 180 nm. The blocking layer can be made of a quartz glass with a lower refractive index than the quartz glass of the transmission region, and therefore it can contribute to carrying light in the transmission region. By means of the blocking layer the hydrogen concentration in the transmission region can be kept at a high level.

The transmission region is to be understood to mean that region of the component in which the UV light produces the highest defect rates due to its transmission. This is, for example, the light-carrying core in a fiber; in the case of a lens it is especially the entry and exit surfaces for the radiation.

With regard to stability of the component under radiation, hydrogen and deuterium are equally effective. If in connection with the charging of quartz glass the term "hydrogen" is used it is to be understood here and hereinafter to mean hydrogen and/or deuterium unless otherwise expressly stated.

The charge of hydrogen or deuterium is determined by spectroscopy. For the hydrogen charge a basic vibration used is 2.42 $\mu m$, and for the deuterium charge the basic vibration used is 3.58 $\mu m$. To arrive at quantitative figures, a calibration specimen with a known hydrogen or deuterium charge is measured at these wavelengths and the result is used for comparison with the corresponding measurement made in the unknown hydrogen or deuterium concentration.

The component can be encased completely or partially with the blocking layer. In some applications it is important that the functional surfaces be provided with the blocking layer. The term, "functional surfaces," is to be understood to mean those surfaces of the transmission region in which the UV light enters the component or exits from the component or which contribute to the guidance of the UV light, such as for example the mantle glass enveloping the core of a fiber optic. The optical components are, for example, fibers, lenses, prisms, windows, masking plates or filters.

A component has proven to be especially appropriate in which the thickness of the first blocking layer is between 5% and 50%, preferably 20%, of the total outside dimension of the transmission region and the blocking layer. This prevents the loss of hydrogen from the transmission region by diffusion. The thicker the first blocking layer is made, the more effective is the prevention of such hydrogen loss from the transmission region. There is no definite maximum layer thickness; it is determined primarily by economic considerations.

For example, in the case of a component in the form of a fiber optic, the thickness of the first blocking layer will be the thickness of the mantle glass enveloping the fiber core, while the term, "total outside dimension of the carrier core and blocking layer" in that case, means the outside diameter of the mantle glass. The core of the optical fiber is in that case the transmission region. As the thickness of the blocking layer increases the diffusion of hydrogen out of the fiber is increasingly impeded, but this positive effect in the case of blocking layer thicknesses above the stated maximum limit is counteracted by the relative increase of the cross-sectional area of the fiber at the expense of the core area carrying the UV light.

Advantageously, a blocking layer enveloping the first blocking layer is provided, containing aluminum, chromium, nickel, lead, silver, gold, graphite, a carbide, nitride or oxynitride, especially silicon oxynitride. By this means the diffusion of hydrogen out of the transmission region is hampered or even prevented at high temperatures, and the long-term stability of the optical and mechanical properties of the component is improved. Such blocking layers can be applied, for example, by appropriate gas phase reactions or by cathode sputtering.

What has proven to be especially valuable is an optical component in which the first or second blocking layer has areas of high permeability to hydrogen and areas of low permeability to hydrogen. The differences in the hydrogen permeabilities of different areas of the blocking layer may be based on different diffusion constants of the materials used for the blocking layer, or on different thicknesses of the blocking layer areas. This embodiment of the optical component of the invention is distinguished by the fact that the blocking layer areas of relatively high hydrogen permeability permit easy charging of the object with hydrogen, while the areas of low hydrogen permeability reduce the later diffusion loss during the appropriate use of the component. This effect is, of course, all the more pronounced the greater the difference is between the hydrogen permeabilities of the areas. Either the first or the second blocking layer or both areas can be configured accordingly.

A component has proven especially good with regard to long-term stability in the transmission of very high energy densities in which the hydrogen concentration in the transmission region amounts to at least $5 \times 10^{20}$ molecules per cubic centimeter.

A component has proven especially suitable in which at least the first blocking layer is built up of several layers of which a first layer is applied before the transmission region is charged with hydrogen/deuterium, and a second layer is applied thereafter. Such a component can easily be charged with hydrogen and is characterized by especially good long-term stability. Advantageously, first a thin blocking layer is applied to the article—a fiber for example—so as to assure mechanical stability. Then the article is charged with hydrogen, while the thin blocking layer is only a slight barrier to diffusion. This diffusion barrier, however, is sufficient to provide effective prevention of diffusion loss during additional processing in which the blocking layer is augmented. This is especially the case if the blocking layer is augmented at a lower temperature or can be performed substantially faster than the charging of the component with hydrogen.

In another preferred embodiment, the optical component is an optical fiber having a transmission region of synthetically manufactured quartz glass, and a plastic protective layer is provided underneath the second blocking layer. The plastic protective layer assures mechanical protection in the handling of the fiber, especially while the fiber is being charged with hydrogen. At the same time the hydrogen can easily diffuse through the protective layer.

For the transmission of UV light of a wavelength less than 270 nm, a component has proven to be especially resistant to radiation in which the transmission region has a hydroxyl content of no more than 5 ppm.

In a preferred embodiment of the component, the transmission region is made in the form of at least a fiber or a rod, and is surrounded at least partially by a sheath containing a liquid or gaseous coolant. With this the transmission region can be kept at a low temperature thereby slowing the loss of hydrogen by diffusion from the transmission region. The coolant can be air, oxygen, inert gases or an appropriate liquid coolant. It is not necessary for the envelope to completely surround the component. Usually the end faces of the fiber or rod are freely accessible. But the cylindrical surface of the fiber or rod need not be completely surrounded by the sheath. Between the cylindrical mantle surface and the inside of the sheath a gap remains which is filled with the coolant. Especially simple is a component in which the sheath bears a tubular Peltier element. Usually several Peltier elements are provided. These can be sleeve-like. By means of the Peltier element or elements the coolant can be cooled without requiring complex apparatus.

As regards the method, the problem set forth above in accordance with the invention is solved, setting out from the method explained in the beginning, by the following steps:

a) Coating the fiber with a blocking layer inhibiting hydrogen diffusion, and b) Charging the fiber in an atmosphere containing hydrogen at a pressure in the range from 0.1 MPa to 200 MPa, and at a temperature between 100° C. and 800° C., by producing a hydrogen-deuterium concentration of at least $5 \times 10^{18}$ molecules per cm$^3$ in the transmission region.

According to the invention, first an optical fiber is made, for example by drawing from a preform. Then the optical fiber is provided with a blocking coat against the loss of hydrogen by diffusion. This blocking layer can be layers of quartz glass or one of the above-named metallic or ceramic materials. The blocking layer must be designed as regards thickness and the material such that thereafter the performance of process step b) will still be possible within an economically acceptable period of time, which can amount to several days.

The blocking layer impedes on the one hand the diffusion of hydrogen into the fiber during process step b), but on the other hand also impedes the escape of hydrogen by diffusion from the transmission region, especially at the higher temperatures of process step b). It has been found that, at a pressure ranging from 0.1 MPa to 200 MPa and at a temperature between 100° C. and 800° C. the difficulty of diffusion into the fiber is more than compensated by the prevention of the loss of hydrogen by diffusion.

The hydrogen-containing atmosphere can consist of 100% $H_2$ or $D_2$, or of a mixture of $H_2$ and $D_2$ and an inert gas. At a pressure of more than 200 MPa the process becomes uneconomical, and likewise at a temperature below 100° C., due to the low rate of diffusion of hydrogen. At a temperature of more than 800° C. the danger of damage to the blocking layer increases.

Especially preferred is a procedure in which steps a) and b) are performed several times in succession, one blocking layer consisting of several thinner coats being built up, on the condition that after the topmost layer is applied step b) can be omitted.

The hydrogen charging of the transmission region is easier if, prior to the first time step b) is performed, the transmission region is charged with hydrogen/deuterium.

In a preferred procedure the doping is performed at a temperature between 100° C. and 400° C. In this temperature range the diffusion of hydrogen into the transmission region takes place sufficiently fast, without the danger of thermal damage of a coating present on the component.

With regard to utilization, the above-described problem is solved by the invention by the fact that

- at 193 nm the minimum UV energy density is at least 1.5 J/cm$^2$,
- at 248 nm the minimum UV energy density is at least 2.0 J/cm$^2$,
- at 285 nm the minimum UV energy density is at least 2.5 J/cm$^2$ and
- at 308 nm the minimum UV energy density is at least 3.5 J/cm$^2$, a laser pulse length of at least 10 ns being established for the transmission of the UV light emitted by a laser.

Surprisingly, contrary to what was expected on the basis of the method known in the state of the art, namely that at very high hydrogen concentrations of at least $5 \times 10^{18}$ molecules/cm$^3$ a further impairment of the radiation stability of the quartz glass necessarily occurs, it has been found that an even excellent radiation stability is achieved if, in conjunction with high hydrogen concentrations in the transmission region of the component, UV light is transmitted with high energy densities.

Fundamentally, radiation stability has been observed to diminish as the energy density increases. It was all the more surprising to find that transmission with an energy density that is very high in comparison to the prior-art method resulted an excellent lifetime performance of the optical component used in transmitting it.

To explain this surprising effect it may be assumed that each UV light involves a specific rate of creation of defects depending on the wavelength and the input energy density. These specific defect creation rates can in each case be correlated with a saturation level of the hydrogen content. In the case of a hydrogen concentration below the saturation value, the rate of healing by the hydrogen is too slow; in the case of hydrogen concentrations above saturation, the excess hydrogen molecules might have a negative effect. They might, for example, interfere with diffusion mechanisms relevant to the healing or even contribute to an additional formation of defects.

It has been found that, in the case of the above-given wavelengths and energy densities this saturating hydrogen concentration is above the stated minimum of $5 \times 10^{18}$ molecules/cm$^3$. This relationship has been proven to be correct with hydrogen charges of up to $5 \times 10^{21}$ molecules/cm$^3$. It is assumed that it is to be observed even at still higher hydrogen concentrations. In particular it is to be expected that, at energy densities that are above the stated minimum levels, the hydrogen saturation concentration is in every case above the stated minimum value.

The energy densities stated above are measured by relating the total energy of the UV light put into the transmission region to the size of the irradiated surface. The area can be set by means of a mask. In the case of a fiber optic, the area is determined by the cross section of the fiber core. The irradiated area can also be determined by means of a beam analyzer. The UV light to be transmitted by be put out for example by a laser, an excimer radiator or a deuterium lamp.

It is to be assumed that the same effects are observed also in the UV light of other wavelengths than those listed; the minimum energy density for a particular UV light can be interpolated from the values given.

In the case of transmission of laser radiation, the pulse length of the laser pulses is set to at least 10 ns. The transmitted energy increases linearly with the pulse length, while a radical relationship exists between the induced damping and the pulse length Advantageously, the operating temperature during the proper use of the component is set at least 50° C. lower than the temperature that was set while the component was being charged with hydrogen or deuterium. The lower working temperature assures that the diffusion of hydrogen out of the component is slower than the diffusion of hydrogen into the component while it is being prepared.

DETAILED DESCRIPTION OF THE PREFERRED EMBODIMENTS

Figure 1:
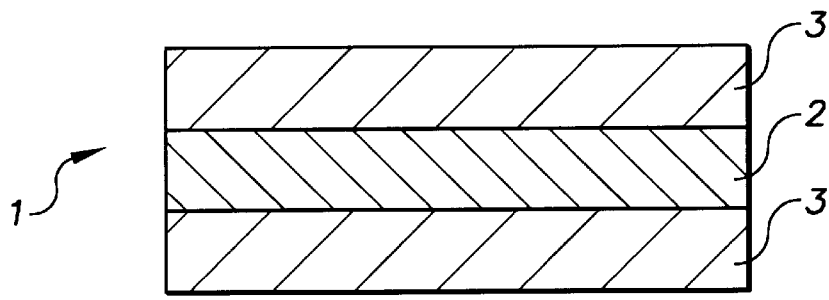
FIG. 1: is a diagrammatic representation of a longitudinal section through a component according to the invention, in the form of a fiber of a first embodiment

In the embodiment represented in FIG. 1 the optical fiber 1 consists of a core 2 of undoped, synthetically manufactured quartz glass enveloped by a jacket 3. The jacket 3 consists of synthetic quartz glass which is doped with about 4% fluorine by weight. The fiber 1 has a length of 1 m. The diameter of the core 2 of fiber 1 is about 200 µm. The jacket 3 has a thickness of 100 µm. The overall outside diameter of the fiber 1 thus amounts to 400 µm; the ratio of the jacket thickness to the overall outside diameter is 1:4.

The core 2 is charged with hydrogen in a concentration of $5 \times 10^{20}$ molecules per cm$^3$ and has a hydroxyl ion content of about 2 ppm.

Charging the fiber 1 with hydrogen was performed at a temperature of 80° C. and a pressure of about 30 MPa (300 atm) in a hydrogenous atmosphere. The charging time was 200 hours.

The fiber 1 is characterized by a large core cross section and is used for application in the field of the power transmission of high-energy UV light for industrial applications. In this case no great flexibility can be required of the fibers. To prevent loss of the hydrogen by diffusion the fiber is carried in a sheath (not shown in FIG. 1) which can be cooled by Peltier elements. The transmitted UV light has a wavelength of 193 nm and an energy density of about 2 J/cm$^2$.

If, in the following FIGS. 2 to 6, reference numbers identical to those in FIG. 1 are used, they are intended to identify the same or equivalent components as explained for such numbers in connection with FIG. 1.

Figure 2:
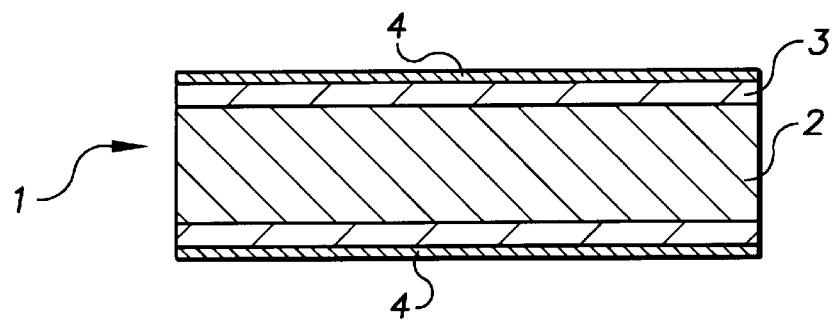
FIG. 2: is a diagrammatic representation of a longitudinal section through a component according to the invention, in the form of a fiber of a second embodiment.

In the embodiment according to FIG. 2, the optic fiber 1 has a core 2 of quartz glass which is doped with about 1 wt.-% of fluorine, and a jacket 3 of quartz glass doped with approximately 5 wt.-% of fluorine. The jacket 3 is enveloped with a diffusion blocking layer 4 of graphite 0.5 μm thick. The fiber 1 has a length of approximately 0.5 μm. The diameter of the core 2 of fiber 1 is about 50 μm. The jacket 3 has a thickness of 2.5 μm. The total outside diameter of the fiber 1 thus amounts to 56 μm.

The core 2 is charged with deuterium in a concentration of $5 \times 10^{20}$ molecules/cm$^3$ and has a hydroxyl ion content of about 600 ppm.

Fiber 1 was charged with deuterium at a temperature of 80° C. and a pressure of about 37 MPa (370 atm) in an atmosphere containing deuterium. The charging time was 200 hours.

The fiber 1 is intended for use in a dental apparatus for irradiating teeth with UV light of a wavelength of 193 nm. For this purpose a plurality of fibers 1 are gathered to form a light-conducting bundle.

For the treatment of teeth, a UV light of a wavelength of 183 nm and an energy density of 2 J/cm$^2$ is emitted by an excimer laser, the length of the laser pulses is set at 20 ns and the repeat rate at 25 Hz. Even after a long period of operation corresponding to about 2000 laser pulses, no decrease of the initial transmission of the quartz glass could be found. The jacket 3 and the diffusion blocking layer 4 prevent the deuterium from diffusing out and permit the fiber 1 to be used even at rather high temperatures, for example of around 80° C.

The fiber is also suitable for use in the field of angioplasty. In this case the operation is performed with UV light of a wavelength of 308 nm. To prepare a catheter a plurality of the fibers illustrated in FIG. 2 are combined in a bundle. UV light of a wavelength of 308 nm is transmitted with an energy density of 4 J/cm$^2$. A KrF excimer laser is used, in which the length of the laser pulses is set at 20 ns and the repetition rate at 20 Hz. The operating temperature during transmission is about 37° C., and the transmission time 24 hours. Under these conditions no irreversible additional damping of the quartz glass caused by the UV light could be found.

Figure 3:
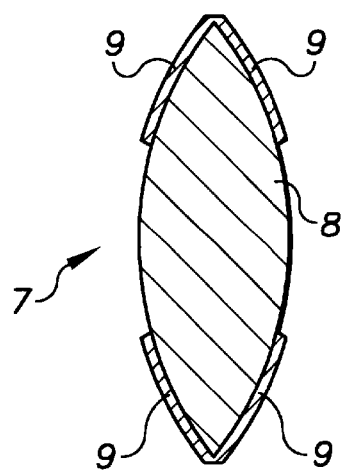
FIG. 3: is a diagrammatic representation of a longitudinal section through an optical lens.

The use of an optical component in accordance with the invention will be explained below in conjunction with FIGS. 3 and 4. In FIG. 3 there is represented a cross section of an optical lens 7 of quartz glass. At its outer margin the light exit face 8 of the lens 7 is provided with a circumferential, continuous metal coating 9 of aluminum. This metal coating 9, which was applied by cathode sputtering after the lens 7 had been charged, prevents the diffusion of hydrogen out of the lens 7. The quartz glass of lens 7 is charged with approximately $7.5 \times 10^{21}$ molecules/cm$^3$ of hydrogen.

The lens 7 was operated with excimer laser light of a wavelength of 265 nm, an energy density of 3.5 J/cm$^2$, with a laser pulse length of 20 ns and with a repetition rate of 20 Hz, for 24 hours at room temperature. Thereafter an irreversible additional damping of the quartz glass of only 0.2 dB/m was found using a test wavelength of 248 nm.

Figure 4:
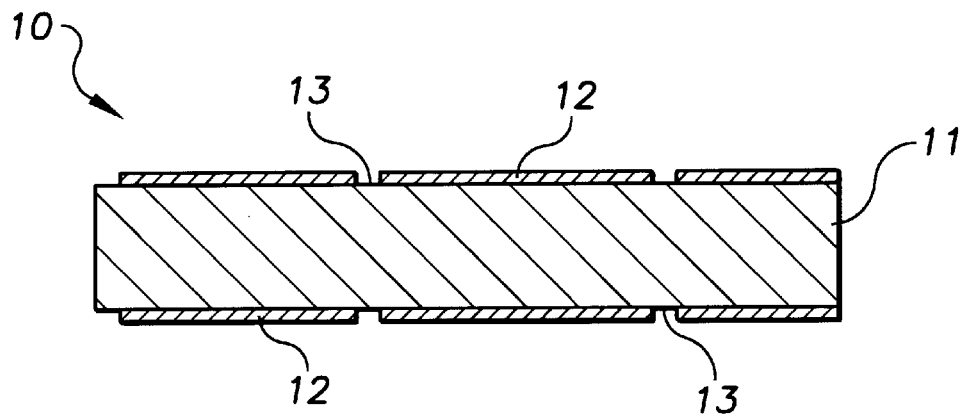
FIG. 4: is a diagrammatic representation of a longitudinal section through an optical waveguide in rod form.

FIG. 4 shows a longitudinal section of a portion of a light pipe 10. It has an optical waveguide 11 consisting of a number of individual quartz glass optical fibers. Its outside diameter is 1 mm. The optical waveguide 11, which has a hydrogen concentration of $7.5 \times 10^{21}$ molecules/cm$^3$ is surrounded in sections by a protective covering 12 which consists of a silicon oxynitride deposited from the vapor phase. The protective covering 12 leaves annular gaps 13 exposing the waveguide 11, which are about 1 mm wide. The protective covering 12 has a thickness of 2 μm and impedes the diffusion of hydrogen out of the optical waveguide 11. The protective covering 12 can be applied before the waveguide is charged with hydrogen. The gaps 13 permit the hydrogen to be diffused into the optical waveguide 11.

Figure 5:
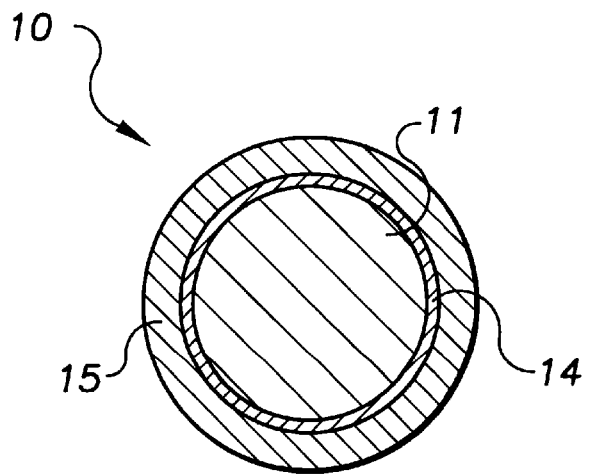
FIG. 5: is a radial cross section through a component according to the invention in the form of an optical waveguide of a second embodiment.

In the cross section shown in FIG. 5, taken through a light pipe 10 similar to the one represented in FIG. 4, the outer surface of the optical waveguide 11 is completely covered by a first thin, continuous protective layer 14 and a second, thick, continuous protective cover 15. The thin protective cover 14 has a thickness of 3 μm. The protective layers 14 and 15, which consist of quartz glass having a lower refractive index than the quartz glass of the optical waveguide 11, prevent the diffusion of hydrogen out of the optical waveguide 11, and at the same time contribute to the conduction of light within the waveguide.

The charging of the optical waveguide 11 with hydrogen is performed first by applying the thin protective layer 14 to the optical waveguide 11. This protects the optical waveguide 11 against mechanical damage. Then the optical waveguide 11 is charged with hydrogen as described above, and then the thicker protective layer 15 is applied to the thin protective layer 14, preventing the loss of hydrogen by diffusion.

Figure 6:
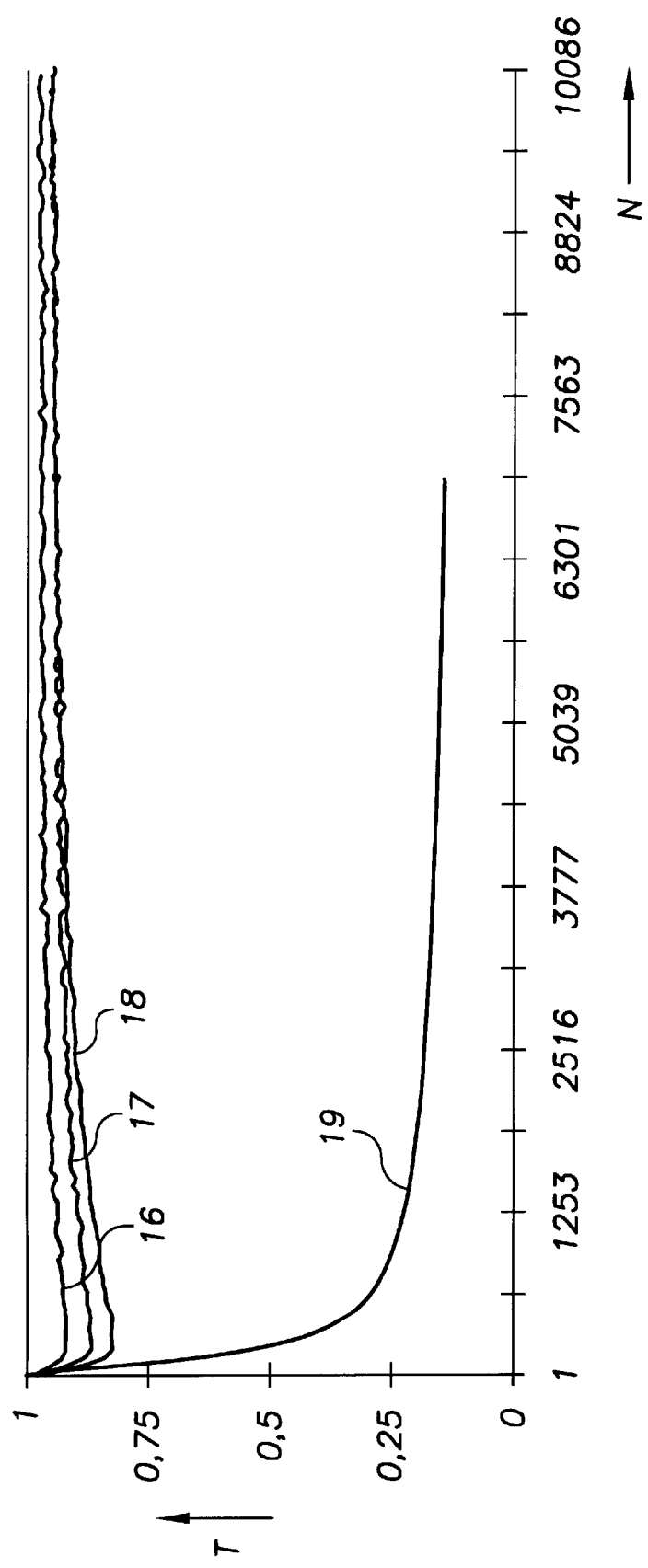
FIG. 6: is a time/state diagram indicating the lifetime performance of optical components when used with ultraviolet radiation.

FIG. 6 is a time/state diagram of optical fibers of the invention in comparison to the time/state diagram of an ordinary optical fiber. To measure the time/state performance of the fibers, ultraviolet light of a wavelength of 248 nm was put through them by means of a KrF excimer laser. The energy densities of the light were set at 3.0 J/cm$^2$, the laser pulse length at 15 ns, and the repetition rate at 20 Hz. The fiber length was always 1 meter. The geometry of the fibers is otherwise the same as that of the optical fibers explained in connection with FIG. 2. The transmission of the fibers was measured with respect to the number of laser pulses. In the diagram of FIG. 6 a transmission "T" is plotted on the y-axis and the number of laser pulses "N" is plotted on the x-axis. In the diagram the time/state curves of a total of four different fibers are represented, which differ only in the deuterium concentration in the cores.

Curve 16 represents the time/state behavior of a fiber with $5 \times 10^{19}$ molecules/cm$^3$, curve 17 a fiber with $1 \times 10^{20}$ molecules/cm$^3$ and curve 18 a fiber with $5 \times 10^{20}$ molecules/cm$^3$, of deuterium in the core.

The time/state diagram clearly shows that no photodegradation occurs in the fibers of the invention Nos. 16, 17 and 18.

On the other hand, the common commercial optical fibers with $5 \times 10^{18}$ molecules/cm3 of deuterium, whose time/state performance is represented by curve 19, show a definite, irreversible decrease in transmission after only about 1000 laser pulses.

Figure 7:
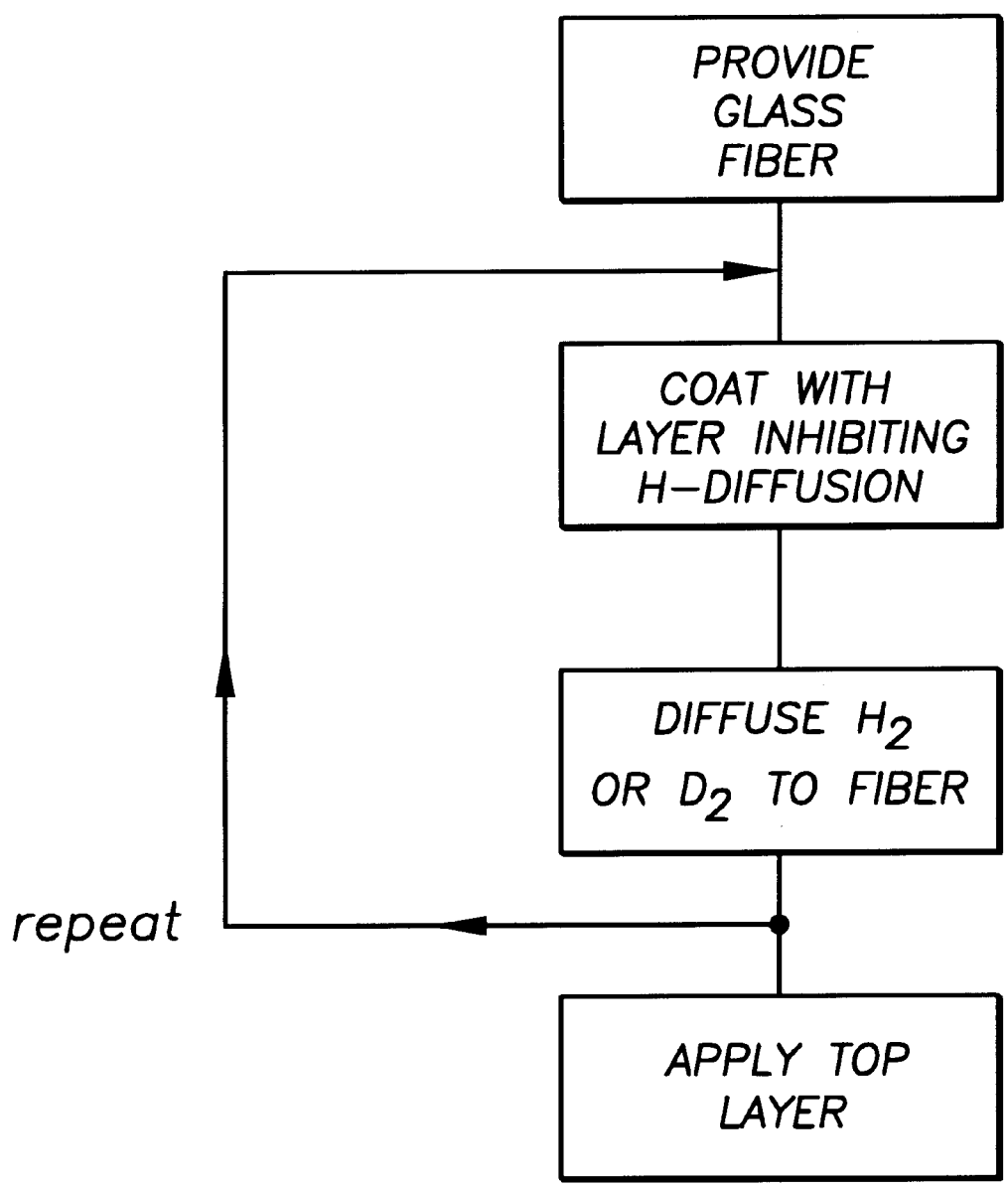
FIG. 7: is a flow chart illustrating a method of making the optical components.

FIG. 7 shows in flowchart form the steps of making an optical component according to the invention, with optical repeated coating and charging steps.

The component according to the invention is appropriate for the transmission of excimer laser light in the medical arts, as for example in angioplasty, in opthalmology for the removal of cornea tissue, or for the treatment of teeth. In addition there are industrial applications of the components of the invention, for example for the transmission of excimer laser light in stepper machines or in materials handling, as well as in spectroscopy for the transmission of deuterium lamp light in capillary electrophoresis.

What is claimed is:

1. A method of producing an optical component for the transmission of UV light, said method comprising: preparing an optical fiber from synthetic quart glass or from doped synthetic quartz glass which is provided with a transmission region for the transmission of UV light, and charging the transmission region with hydrogen and/or with deuterium, said charging including a) coating the fiber with a blocking layer inhibiting hydrogen diffusion, and
   b) charging the fiber in an atmosphere containing hydrogen and/or deuterium, said atmosphere being under a pressure in the range from 0.1 MPa to 200 MPa and at a temperature between 100° C. and 800° C. so as to produce a concentration of said hydrogen and/or deuterium of at least $5\times10^{19}$ molecules/cm$^3$ in the transmission region; and wherein the process steps a) and b) are performed repeatedly, said blocking layer being built up to comprise a plurality of thinner layers including a top layer, after application of which charging is discontinued.

2. Method according to claim 1, wherein the synthetic quartz glass is doped with doping introduced at a temperature between 100° C. and 400° C.

* * * * *